L. WOLFFGRAM.
MACHINE FOR STRAIGHTENING PIPES, RODS, AND THE LIKE.
APPLICATION FILED JAN. 26, 1918.
1,408,791.
Patented Mar. 7, 1922.
2 SHEETS—SHEET 2.
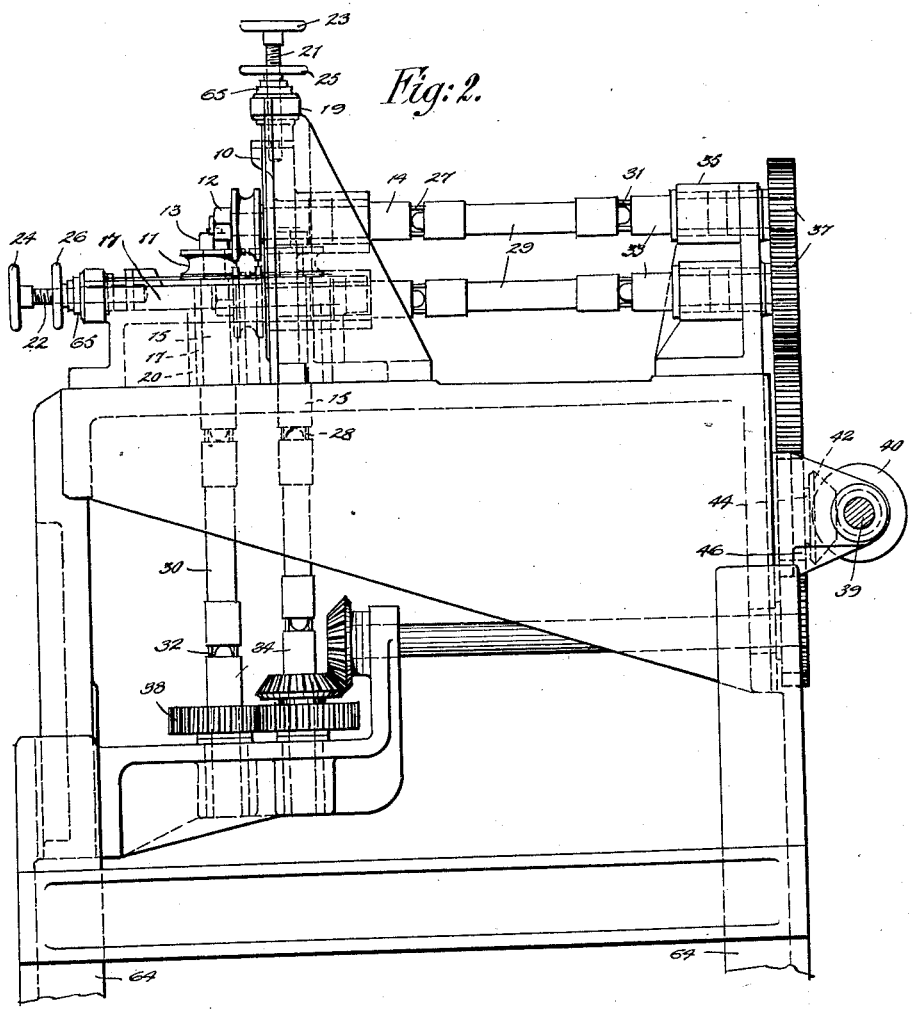
Fig: 2.
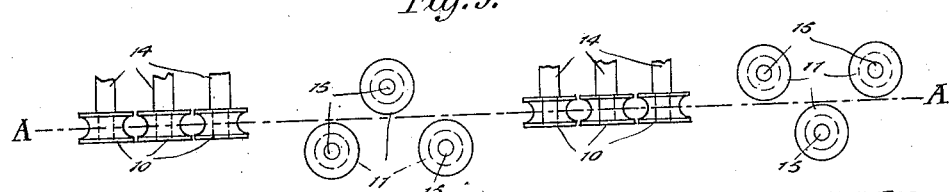
Fig: 3.
INVENTOR
Ludwig Wolffgram
By Carl P. Loepel
ATTORNEY

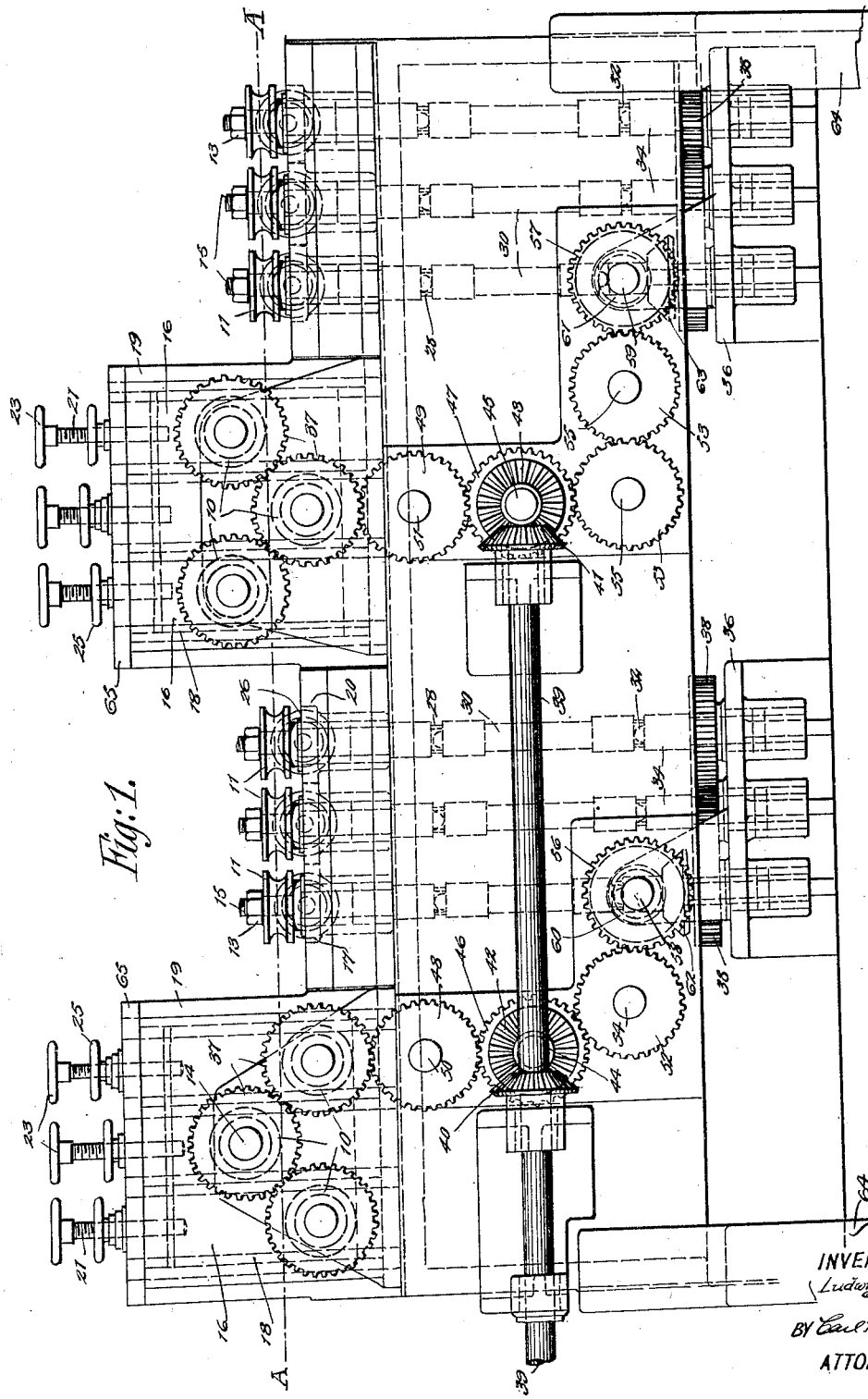

UNITED STATES PATENT OFFICE.

LUDWIG WOLFFGRAM, OF ERIE, PENNSYLVANIA.

MACHINE FOR STRAIGHTENING PIPES, RODS, AND THE LIKE.

1,408,791.  Specification of Letters Patent.  Patented Mar. 7, 1922.

Application filed January 26, 1918. Serial No. 213,897.

*To all whom it may concern:*

Be it known that I, LUDWIG WOLFFGRAM, a citizen of the United States, and resident of Erie, county of Erie, and State of Pennsylvania, have invented certain new and useful Improvements in Machines for Straightening Pipes, Rods, and the like, of which the following is a specification.

My invention relates to a device or machine for straightening pipes, bars, rods, tubes, and the like, and has for its purpose to provide an efficient construction of this type in which provision is made for adjusting the operative members in a peculiar, novel way, which I have found conducive to rapid and reliable operation. In my improved machine, I employ grooved or profiled rollers arranged in groups, the rollers of the same group rotating in substantially the same plane, but being adjustable individually lengthwise of their axes of rotation. The rollers of adjacent groups rotate about axes arranged at an angle to each other, and preferably rollers of alternate groups rotate about horizontal axes, while the rollers of the other groups rotate about vertical axes.

A specific embodiment of this invention is illustrated in the accompanying drawings, in which—

Figure 1 is a front elevation of the improved straightening machine;

Figure 2 is an end elevation thereof; and

Figure 3 is a diagrammatic plan view.

The rollers are arranged in groups, four groups being illustrated in the drawing, the rollers 10 rotating about horizontal axes, and the rollers 11 rotating about vertical axes. Each group comprises, say three rollers arranged at the apexes of a triangle, said staggered rollers rotating about parallel axes and having their profiled peripheries normally so located that the centers of these peripheries will be in the same plane of rotation. Each roller is secured as by a nut 12 or 13 to a short shaft 14 or 15 respectively, journaled in a slide 16 or 17 respectively. The slides 16 are movable vertically along guideways 18 on the frame 19 of the machine, while the slides 17 are movable along parallel horizontal guideways 20 in said frame. As means of adjusting the slides, I have shown screws 21 and 22 respectively, extending lengthwise of the slides and held to move therewith longitudinally, but free to turn relatively thereto. These adjusting screws fit into threaded openings in the frame of the machine, and are provided with heads 23 and 24 respectively to manipulate them. Lock nuts 25 and 26 are preferably provided to hold the screws and slides after adjustment. The normal position of the rollers composing the several groups, is such, that a straight path, indicated by the line A, will be provided through the machine for the article to be straightened, which article passes successively between the horizontal and the vertical profiled rollers. In order to rotate the short roller carrying shafts 14 and 15, irrespective of their adjustment, I have connected them by universal couplings 27 and 28 with intermediate shaft portions 29 and 30 respectively, the other ends of which are connected by similar universal couplings 31 and 32 with short shafts 33 and 34, parallel with the respective shafts 14 and 15, and journaled in bearings 35 and 36, which are stationary on the frame of the machine. Each of the shafts 33 and 34 has rigidly secured to it a wheel 37 or 38, one of the wheels belonging to the same set of rollers meshing with the other two wheels 37 or 38. One of the wheels of each set is driven from the main shaft 39 in any suitable way, for instance, the main shaft may carry mitre gears 40 and 41 in mesh with similar wheels 42 and 43 on short transverse shafts 44 and 45, which transverse shafts carry drive wheels 46 and 47, each of which, by means of intermediate spur gears 48 and 49 mounted loosely on stationary stub axles 50 and 51, drives the wheels 37 of the two groups of horizontal rollers. These same wheels 46 and 47 also engage spur gears 52 and 53 mounted loosely on stationary stub axles 54 and 55, said spur gears driving similar gears 56 and 57 on transverse shafts 58 and 59. These shafts 58 and 59 also carry mitre gears 60 and 61 in mesh with mitre gears 62 and 63 on one of the short shafts 34 of each set.

The frame of the machine is of any suitable construction, being shown as provided with legs 64 and preferably removable plates 65 are secured, as by screws, to the frame of the machine to engage the slides and normally prevent their withdrawal, but upon removing these plates, the slides are accessible and may be taken out if desired.

As shown in Figure 1, the first group of horizontal rollers 10 has the reverse arrangement to the second group of rollers 10, that is, in one of these groups the middle roller 10 is above the other two, and in the other group the middle roller 10 is below the other two. Similarly, Figure 3 shows that the arrangement of the vertical rollers 11 in the first group is the reverse of that in the second group of rollers 11, that is to say, the middle roller 11 of one group is on one side of the line A—A, and the middle roller 11 of the other group is on the opposite side of said line. While I prefer this arrangement, I do not wish to be restricted thereto, but various modifications may be made without departing from the nature of my invention as set forth in the appended claims.

The rollers 10, 11 are of equal diameters and profiles, in the construction shown, and rotate with the same peripheral speed to feed the pipe or other article and at the same time straighten it.

I claim:

1. In a machine of the character described, a plurality of equi-distantly spaced series of rolls, the rolls in successive series having their axes disposed in respectively horizontal and vertical positions and each series of rolls being arranged in substantially triangular formation to provide a path therebetween for the material to be straightened, gears operatively connecting the rolls in each series to each other, a gear train connecting each series of rolls having their axes extending horizontally to an adjacent series of rolls having their axes extending vertically, and a common drive shaft for said gear trains.

2. In a machine of the character described, several successive series of rolls having their axes disposed in respectively horizontal and vertical positions, each of said series composed of three rolls arranged in substantially triangular formation and providing therebetween a path for the material to be straightened, stub shafts carrying said rolls, slides in which said stub shafts are journaled, means for shifting the slides to adjust the rolls toward and from each other, individual drive connections flexibly connected to said stub shafts for permitting of the adjustment of the slides without interference with the drive mechanism.

3. In a machine of the character described, the combination of a plurality of series of straightening rolls, successive series having their axis disposed relatively at right angles, each series composed of three rolls arranged in substantially triangular formation and providing therebetween a path for the material to be straightened, each roll having a grooved periphery, a stub shaft individually carrying each roll, an individually adjustable slide supporting each said stub shaft, individual means for shifting each slide and for securing same in the adjusted position, a drive shaft flexibly connected to said stub shafts for permitting the turning of the rolls while allowing of the adjustment of same.

4. In a machine of the character described, the combination of a frame, a series of slide boxes on the frame, successive boxes arranged respectively vertically and horizontally, a plurality of slides in each box, a stub shaft journaled in each slide, a grooved roll fixed on each of said stub shafts, means whereby said shafts may be individually adjusted in the boxes, means for securing the slides in the adjusted positions, means whereby the slides may be removed from the boxes, a main shaft journaled on the frame, and driving connections from said main shaft to all of said stub shafts, said connections having flexible parts therein.

In testimony that I claim the foregoing as my invention, I have signed my name in presence of two subscribing witnesses.

LUDWIG WOLFFGRAM.

Witnesses:
ROBERT H. CHINNOCK,
JOHN B. EICHENLAUB.